April 8, 1930. J. M. HJERMSTAD 1,754,103
HARROW
Filed April 30, 1928 3 Sheets-Sheet 1
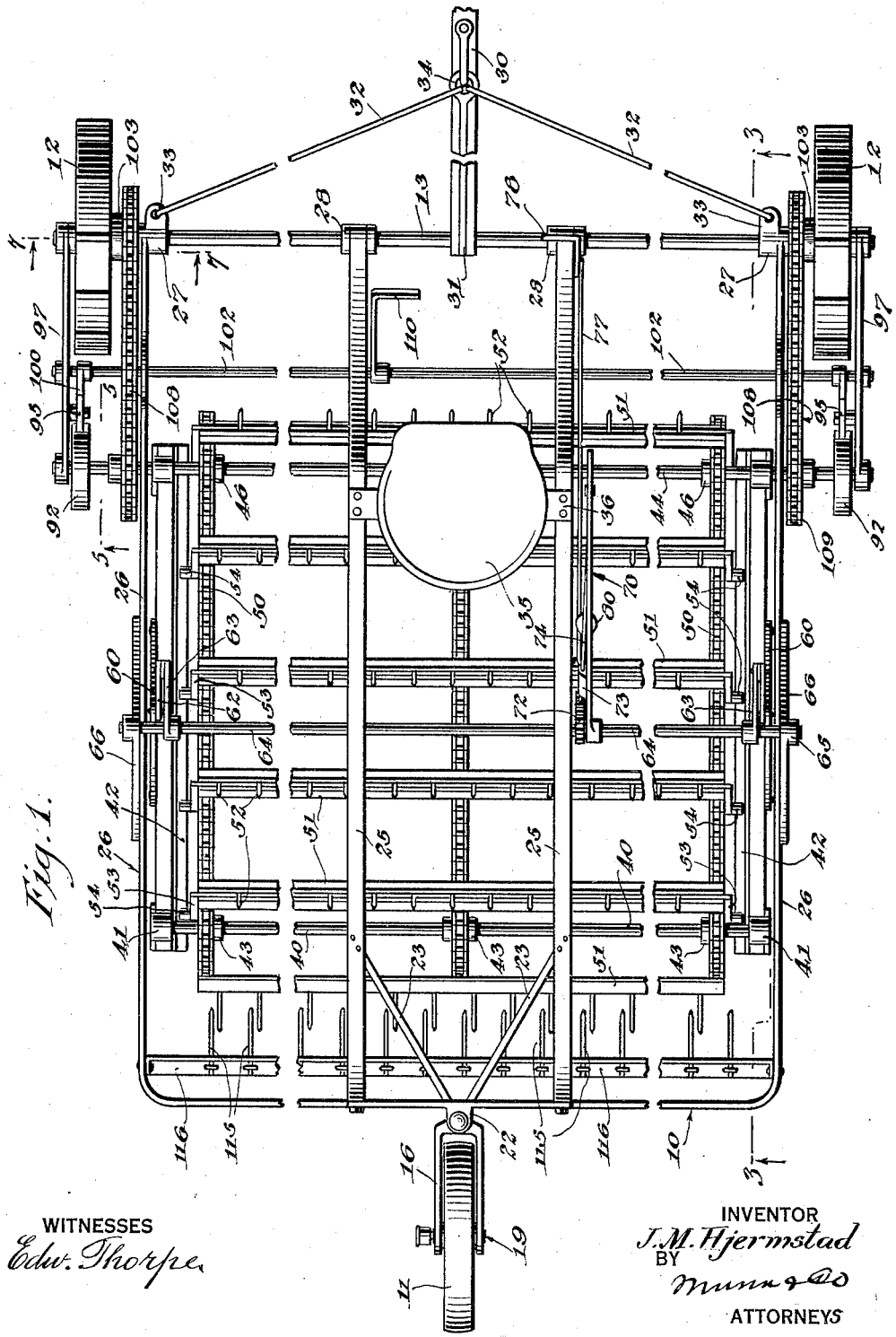

April 8, 1930.  J. M. HJERMSTAD  1,754,103
HARROW
Filed April 30, 1928   3 Sheets-Sheet 2
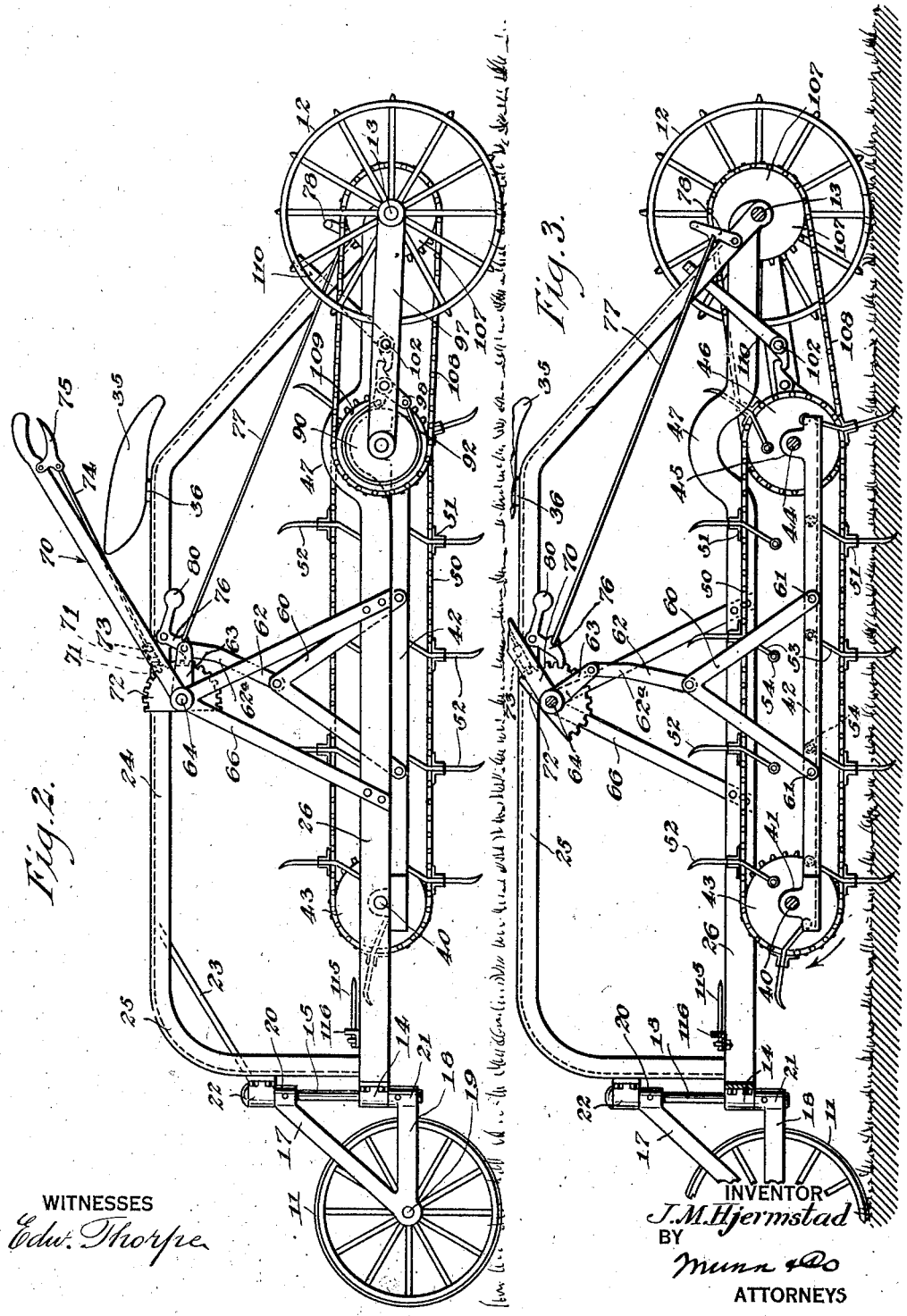
WITNESSES
Edw. Thorpe
INVENTOR
J. M. Hjermstad
BY
Munn &Co
ATTORNEYS

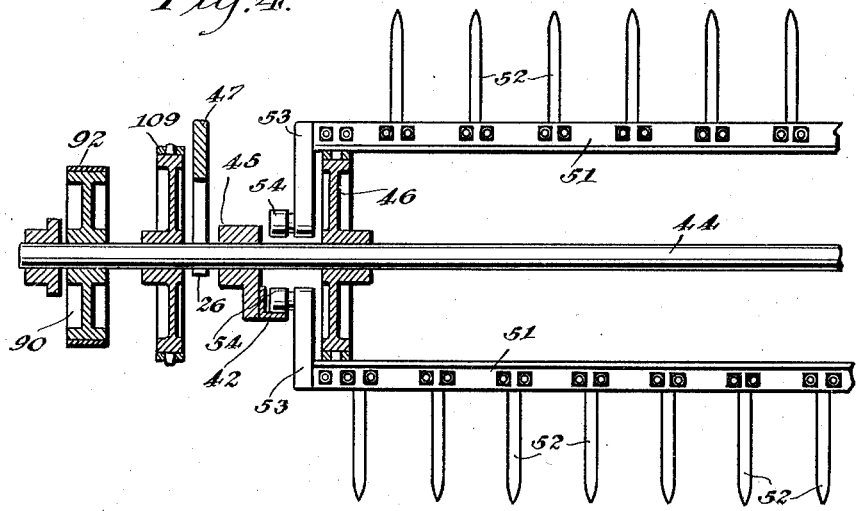
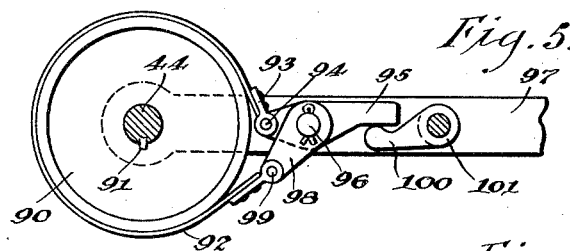
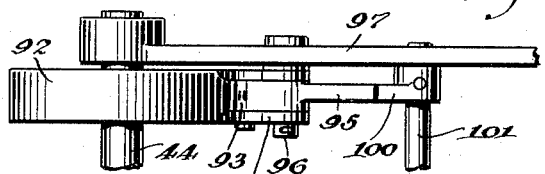
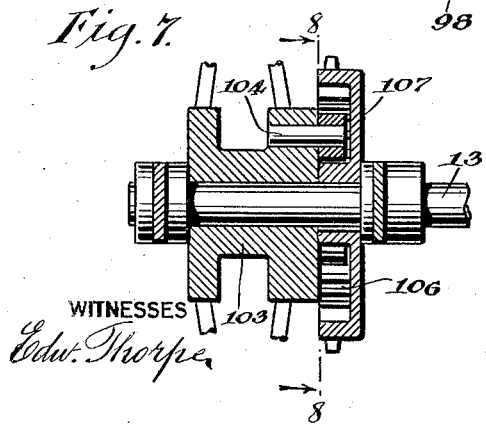

Patented Apr. 8, 1930

1,754,103

UNITED STATES PATENT OFFICE

JOHN M. HJERMSTAD, OF RED WING, MINNESOTA

HARROW

Application filed April 30, 1928. Serial No. 274,146.

This invention relates to harrows for removing the roots of weeds from the soil.

An object of the invention is the provision of a device for removing roots of plants from the soil, by means of a plurality of teeth carried in an operative position along a horizontal path through chains, said chains and teeth being retained stationary at will or the speed of movement of the teeth being retarded.

A further object of the invention is the provision of a harrow including a plurality of chains operated by the usual traction wheels of the harrows and carrying ground engaging teeth moved through a horizontal plane when operatively positioned, the chains and teeth being supported by a frame which may be elevated at will in an inoperative position when the harrow is being transported.

A further object of the invention is the provision of a harrow including a plurality of chains operated by the usual traction wheels of the harrows and carrying ground engaging teeth moved through a horizontal plane when operatively positioned, a braking means being incorporated in the driving mechanism for the chains for retarding the speed of movement of said chains or for retarding the speed, provision being further made for disconnecting the chains from operative engagement with the traction wheels when the harrow is reversed from a forward to a backward movement.

This invention will be best understood from a consideration of the following detailed description, in connection with the accompanying drawings; nevertheless, it is to be understood that the invention is not confined to the disclosure being susceptible of such changes and modifications as shall define no material departure from the salient features of the invention as expressed in the appended claims.

In the drawings:—

Figure 1 is a plan view of a harrow constructed according to the principles of my invention, Figure 2 is a longitudinal side view showing the ground engaging teeth in an inoperative position, Figure 3 is a longitudinal vertical section taken along the line 3—3 of Fig. 1, Figure 4 is a fragmentary vertical section through the operating shaft for driving the ground engaging teeth, Figure 5 is a vertical section taken along the line 5—5 of Fig. 1, Figure 6 is a fragmentary plan view of a brake mechanism, Figure 7 is a transverse vertical section taken along the line 7—7 of Fig. 1, Figure 8 is a vertical section taken along the line 8—8 of Fig. 7.

Referring more particularly to the drawings 10 designates a frame or drag which is substantially rectangular in cross section and constitutes the supports for the various devices which are coordinated to remove the roots of weeds from the soil. The frame in turn is supported in spaced relation with the ground by a rear wheel 11 and front wheels 12 mounted on an axle 13 adjacent the ends thereof.

The rear end of said frame at the middle portion is provided with a bearing 14 in which is mounted an axle 15. A fork 16 formed of arms 17 and 18 carries an axle 19 on which is mounted the hub of the rear wheel 11. The arms 17 and 18 located upon opposite sides of the wheel 11 at the fork have bearings 20 and 21 received by the axle 15. A collar 22 is connected by rods 23 to the upper portion 24 of frame bars 25 aids in retaining the axle in the vertical.

The forward ends of the side bars 26 are provided with bearings 27 which receive and support the axle 13. The forward ends of the frame bars 25 have bearings 28 which receive said axle.

A tongue 30 is connected at 31 to the intermediate portion of the axle and extends forwardly and along the longitudinal axis of the frame 10. Links 32 have pivotal connections with perforated ears 33 and are fastened at 34 to the tongue 30.

A seat 35 is secured to a transverse bar 36 which in turn is rigidly connected at its ends to the upper portion 24 of the frame bars 25 and at points on said bars where they are bent downwardly at an angle towards the front axle.

A shaft 40 has its opposite end carried in bearings 41 on the rear ends of angle irons 42. A plurality of sprockets 43 are rigidly secured to the shaft in spaced relation. A second shaft 44 is mounted in bearings 45 at the other or forward ends of the angle irons 42. Sprockets 46 are secured to the shaft 44 and alined with similarly placed sprockets on the shaft 40. The side bars 26 adjacent the shaft 46 have an arcuately shaped portion 47 to permit upward movement of the shaft as will be presently explained.

A plurality of chains 50 are located in spaced relation longitudinally of the frame 10 and are trained on pairs of the alined sprockets 43 and 46. Bars 51 are connected in spaced relation on the chains and are disposed transversely of the frame and within the confines thereof. Ground engaging teeth 52 are connected to the bars 51 in an outwardly projecting relation with the chains. Arms 53 are secured to the ends of the bars 51 and have their free ends extending upwardly towards the shafts 40 and 44. These arms are inclined at an angle to the vertical and are provided with rollers 54 at the free ends thereof adapted to engage a flange of the angle iron bars 42 when the teeth 52 are in engagement with the ground whereby said teeth are properly supported when removing roots of weeds or other undesirable plants from the ground.

The sprockets 43 and 46, together with their chains 50 and angle iron bars 42 are movable vertically as a unit so that the teeth 52 may be lifted from the ground when the drag is being conveyed to and from a field. A pair of V-shaped brackets 60 are located adjacent the side bars 26 and have their lower ends connected to the angle bars 42 and 61. A link 62 is pivotally connected to the upper end of each bracket 60 and also to a lever 63. The lever is rigid with a shaft 64 which is mounted in bearings 65 formed at the upper ends of V-shaped standards 66 secured at their lower ends to the side bars 26.

The manually operable lever 70 is loosely mounted on the shaft 64 and in close association with the curved rack 72 which is rigid with the shaft 64. A hand lever 75 is pivotally mounted on the free end of the lever 70 and a link 74 connects the hand grip or lever 75 with a pawl 71 slidably mounted in a guide 73. The pawl is adapted to engage the teeth of the rack 72, and a spring 71ª maintains the pawl in position to always engage the teeth. The link 62 is bent at 62ª to provide an angular portion which is adapted to engage over the shaft 64 as will be presently explained.

A pawl 76 pivotally mounted on the bar 24 is connected by a link 77 to a lever or foot treadle 78 pivoted at 79 to a side bar 26. The pawl has a weight 80 for maintaining the pawl in engagement with the teeth of the rack 72. When the treadle is depressed the pawl is released from the rack to permit actuation of the shaft 64 for elevating or lowering of the bars 42 carrying the harrowing unit.

A brake drum 90 is keyed at 91 to the shaft 44 and a brake band 92 is trained around the periphery of said drum. An end 93 of the band is connected at 94 to one end of a lever 95 pivoted at 96 to a link 97. One end of the link is pivoted on the axle 13 while the other end is pivoted on an outer end of the shaft 44. A link 98 is pivoted at one end on the pin 96 and has the other end connected at 99 to the other end of the strap 92.

A lever 100 is secured at 101 to the shaft 102 mounted in bearings in the links 97 and is movable with the links. The hub 103 of each traction wheel 12 has laterally projecting pins 104 upon each of which is pivotally mounted a pawl or dog 105 adapted to engage the teeth 106 of a sprocket 107 loose on the axle 13. A chain 108 is trained over the sprocket 107 and a sprocket 109 rigid with the shaft 44.

It will be noted that the brake drums 90, sprockets 107 and 109 and the related parts are duplicated upon opposite sides of the frame. A foot treadle 110 is rigidly connected to the shaft 102 so that when said treadle is operated and moved forwardly the lever 100 will actuate the lever 95 for tightening the brake band on the drum.

The operation of my device is as follows:

The drag is drawn by the tongue 30 while the cultivating unit is maintained in an elevated position, as shown in Fig. 2, by means of the pawl 76 and the rack 72. When the place has been reached where it is desired to cultivate the soil or remove roots from the ground, the foot pedal 78 is actuated to release the pawl 76. The lever 70 is held rigidly by the hand of the operator and is gradually lowered permitting the cultivating unit to be lowered. When the lever 70 has reached its lower limit of movement, the foot pedal 78 is released whereby the pawl 76 will move into engagement with the rack 72 and hold the cultivating unit against further downward movement. The hand grip or lever 75 is then actuated releasing the pawl 71 whence said lever is moved upwardly and the hand grip is then released to permit the pawl 71 to engage the teeth of the rack 72. The foot pedal 78 is then released and the lever 70 is lowered manually permitting the cultivating unit to be further lowered. These operations are repeated until the teeth are properly engaged in the ground.

As soon as the teeth are engaged in the ground there will be a tendency to move the chain 50 in the direction indicated by the arrow in Fig. 3. The dogs 105 shown in Fig. 8 will engage the teeth 107 of the sprocket 106 and thereby connect with the traction wheel 12 of the sprocket for causing rotation of the sprockets 46 and 43, and likewise the movement of the chains in the direction indicated. However, due to the difference in diameters between the wheel 12 and the sprocket 107 there will be an apparent slippage of motion between the rearward movement of the chain and the forward movement of the vehicle, so that as the vehicle moves forwardly approximately two feet, the teeth will move rearwardly approximately one foot. It will be appreciated, however, that the amount of rearward movement of the teeth 52 as compared to the forward movement will be in direct proportion to the diameters of the sprocket 107 and the wheel 12.

When the device is adapted to be used as a cultivator whereby the teeth 52 are maintained stationary and drawn through the ground, the foot pedal 110 is depressed causing the brake band 92 to grip the drum 90 and prevent rotation of the shaft 44. This will maintain the sprockets 46 and 43 against rotation while the wheel 12 revolves and the dogs 105 slide over the teeth 107 of the sprocket 106. When it is desired to raise the cultivating unit out of the ground, the hand grip 75 will release the spring 71ª forcing the pawl 71 into engagement with the teeth of the rack 72. The lever 70 is then moved upwardly causing rotation of the rack 72 and shaft 64. The lever 63 is then elevated, elevating the link 62 and the cultivating unit, after the pawl 76 has been released from the rack. As soon as the lever 70 has been elevated to a sufficient distance, the foot pedal 78 is released permitting the pawl 76 to engage the teeth of the rack 72 and the hand grip 75 is actuated to release the pawl 71. The lever is then lowered until it reaches a point adjacent the pivotal connection of the pawl 76. By releasing the hand grip 75 the pawl 71 engages the teeth of the rack and the lever may again be elevated for raising the cultivating unit. These operations are repeated a number of times until the cultivating unit has been raised a sufficient distance from the ground. When the unit is in its most elevated position, the angular portion 62ª of the link 62 has engaged over the shaft 64 for aiding in supporting the unit in its elevated position.

It will be noted from an inspection of Figs. 2 and 3 of the drawings that the angle iron bars 42 are carried by the V-shaped members 60 which in turn are swingably supported from the link 62 carried at the free end of the lever 63 since the V-shaped member 60 is connected to the intermediate portions of the handle bars which in effect forms with the shafts 40 and 44 a frame. The frame, the chains, and likewise the sprockets 43 and 46 are swingably supported centrally of the main frame.

I claim:—

1. A cultivator comprising a frame, an axle carried by the frame, traction wheels mounted on the axle, a plurality of pairs of spaced sprockets, chains trained over pairs of the sprockets, spaced angle bars located in a horizontal plane and carrying the sprockets, bars provided with teeth and secured to the chains and transversely of the frame, means located centrally of the frame for bodily elevating the angle bars and for swingably supporting said bars, chains and sprockets, means operatively connecting the sprockets with the traction wheels for causing a braking action on the chains.

2. A cultivator comprising a frame, an axle carried by the frame, traction wheels mounted on the axle, a plurality of pairs of spaced sprockets, chains trained over pairs of the sprockets, spaced angle bars carrying the sprockets, bars provided with teeth and secured to the chains and transversely of the frame, means for moving the angle bars, chains and sprockets vertically, means operatively connecting the sprockets with the traction wheels for causing a braking action on the chains, the last-mentioned bars being provided with arms extending inwardly, rollers on the free ends of the arms adapted to ride on the angle bars for supporting the chains when the teeth are applied to the ground.

3. A cultivator comprising a frame, an axle carried by the frame, traction wheels mounted on the axle, a plurality of pairs of spaced sprockets, chains trained over pairs of the sprockets, spaced angle bars carrying the sprockets, spaced bars provided with teeth and secured to the chains and transversely of the frame, means located centrally of the frame for bodily elevating or lowering the angle bars and likewise the chains and sprockets through horizontal planes, and for swingably supporting said bars, means operatively connecting the sprockets with the traction wheels for causing a braking action on the chains, and means for restraining rotation of the sprockets to prevent movement of the chains and teeth.

4. A cultivator comprising a frame, an axle carried by the frame, traction wheels mounted on the axle, a plurality of pairs of spaced sprockets, chains trained over pairs of the sprockets, spaced angle bars carrying the sprockets, bars provided with teeth and secured to the chains and transversely of the frame, brackets secured to the angle bars intermediate the ends thereof, means located centrally of the frame for elevating or lowering the brackets for moving the angle bars, chains and sprockets through horizontal planes, means operatively connecting the sprockets with the traction wheels for causing a braking action on the chains.

5. A cultivator comprising a frame, an axle carried by the frame, traction wheels mounted on the axle, a plurality of pairs of spaced sprockets, chains trained over pairs of the sprockets, spaced angle bars carrying the sprockets, bars provided with teeth and secured to the chains and transversely of the frame, means for moving the angle bars, chains and sprockets vertically, means operatively connecting the sprockets with the traction wheels for causing a braking action on the chains, the last mentioned bars being provided with arms extending inwardly, rollers on the free ends of the arms adapted to ride on the angle bars for supporting the chains when the teeth are applied to the ground, and a braking means for retaining the chains and teeth against movement.

6. A cultivator comprising a frame, an axle carried by the frame, traction wheels mounted on the axle, a plurality of pairs of spaced sprockets, chains trained over pairs of the sprockets, spaced angle bars carrying the sprockets, bars provided with teeth and secured to the chains and transversely of the frame, means for moving the angle bars, chains and sprockets vertically, means operatively connecting the sprockets with the traction wheels for causing a braking action on the chains, the last mentioned bars being provided with arms extending inwardly, rollers on the free ends of the arms adapted to ride on the angle bars for supporting the chains when the teeth are applied to the ground, manual means for retarding the speed of movement of the chains and teeth longitudinally of the frame.

7. A cultivator comprising a frame, an axle carried by the frame, traction wheels mounted on the axle, a plurality of pairs of spaced sprockets, chains trained over pairs of the sprockets, spaced angle bars carrying the sprockets, bars provided with teeth and secured to the chains and transversely of the frame, a bell crank pivoted on the frame, links connecting the arm of the bell crank with the spaced angle bars for elevating or lowering bodily the angle bars throughout their lengths and also the chains and sprockets and for swingably supporting said bars, means operatively connecting the sprockets with the traction wheels for causing a braking action on the chains.

JOHN M. HJERMSTAD.